Figure 1:
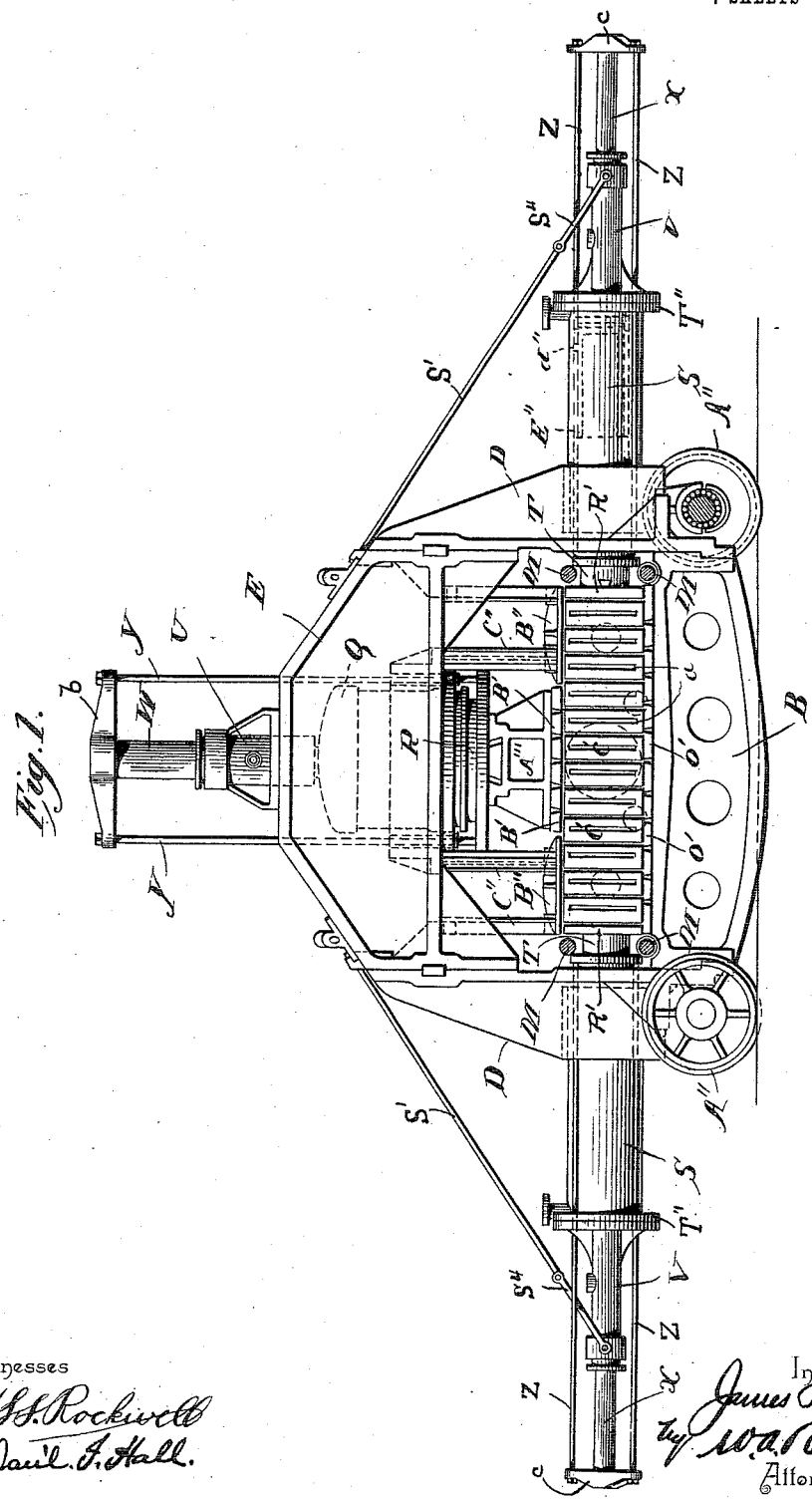

J. P. ROE.
SQUEEZER.
APPLICATION FILED MAR. 24, 1905.

985,451.

Patented Feb. 28, 1911.
7 SHEETS—SHEET 1.

Witnesses
W. S. S. Rockwell
Dan'l T. Hall.

Inventor
James P. Roe,
by W. A. Redmond
Attorney

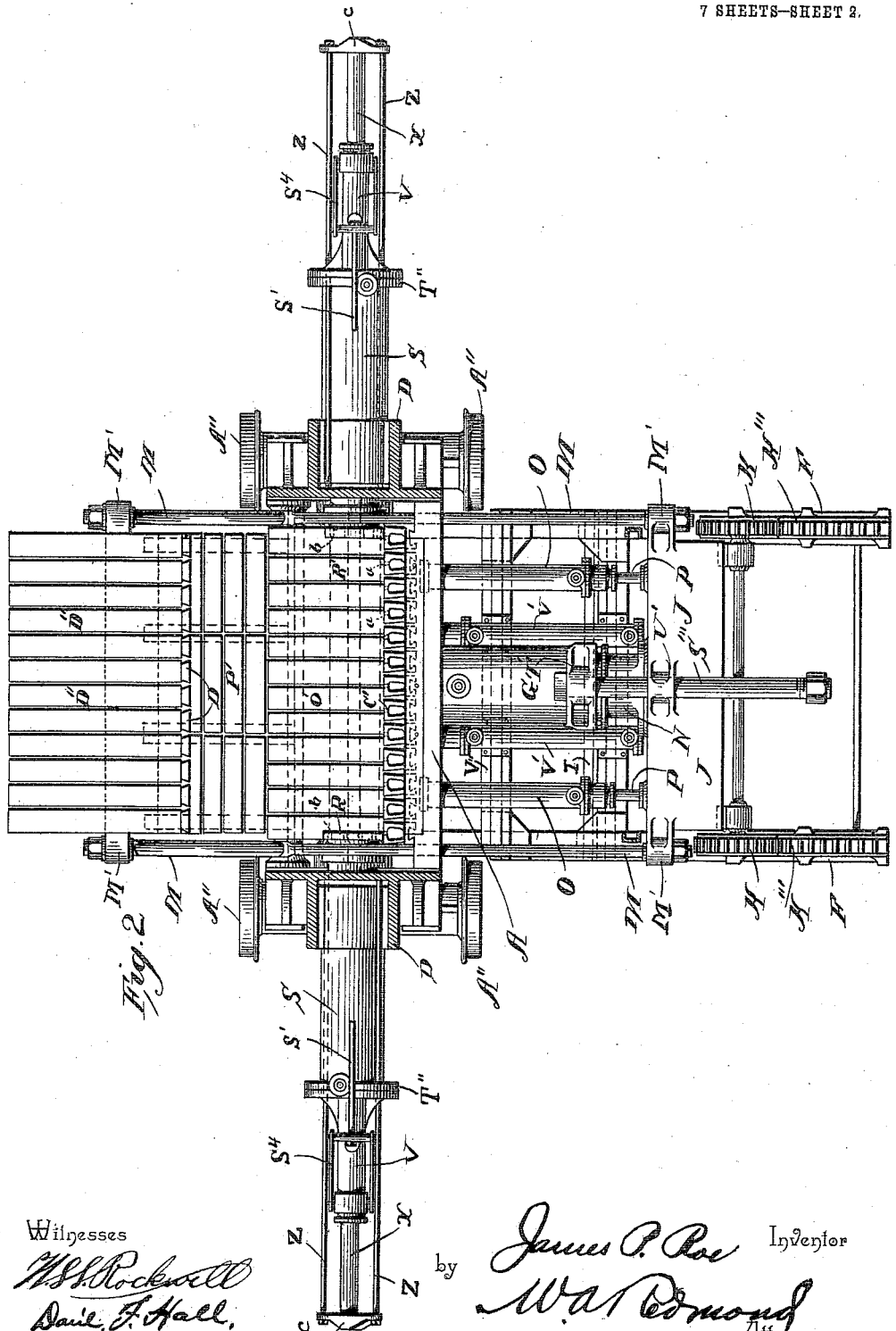

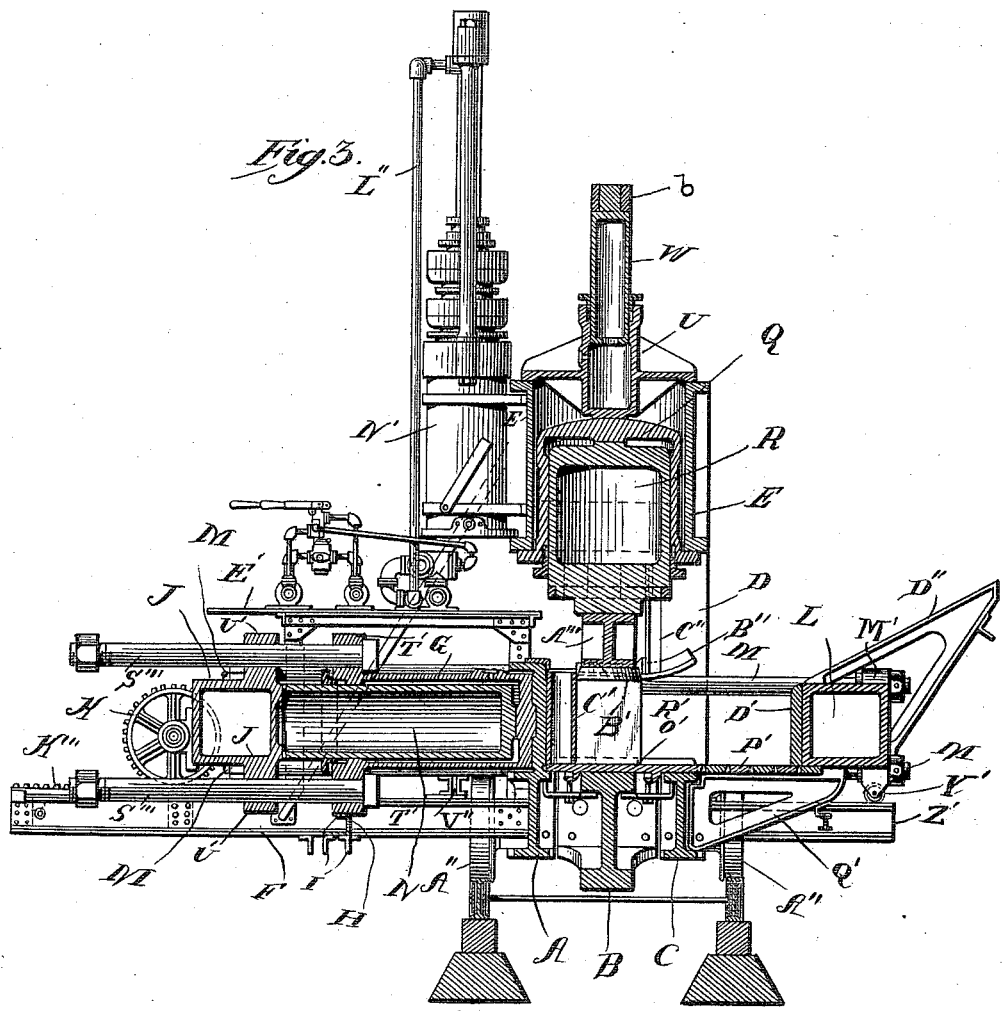

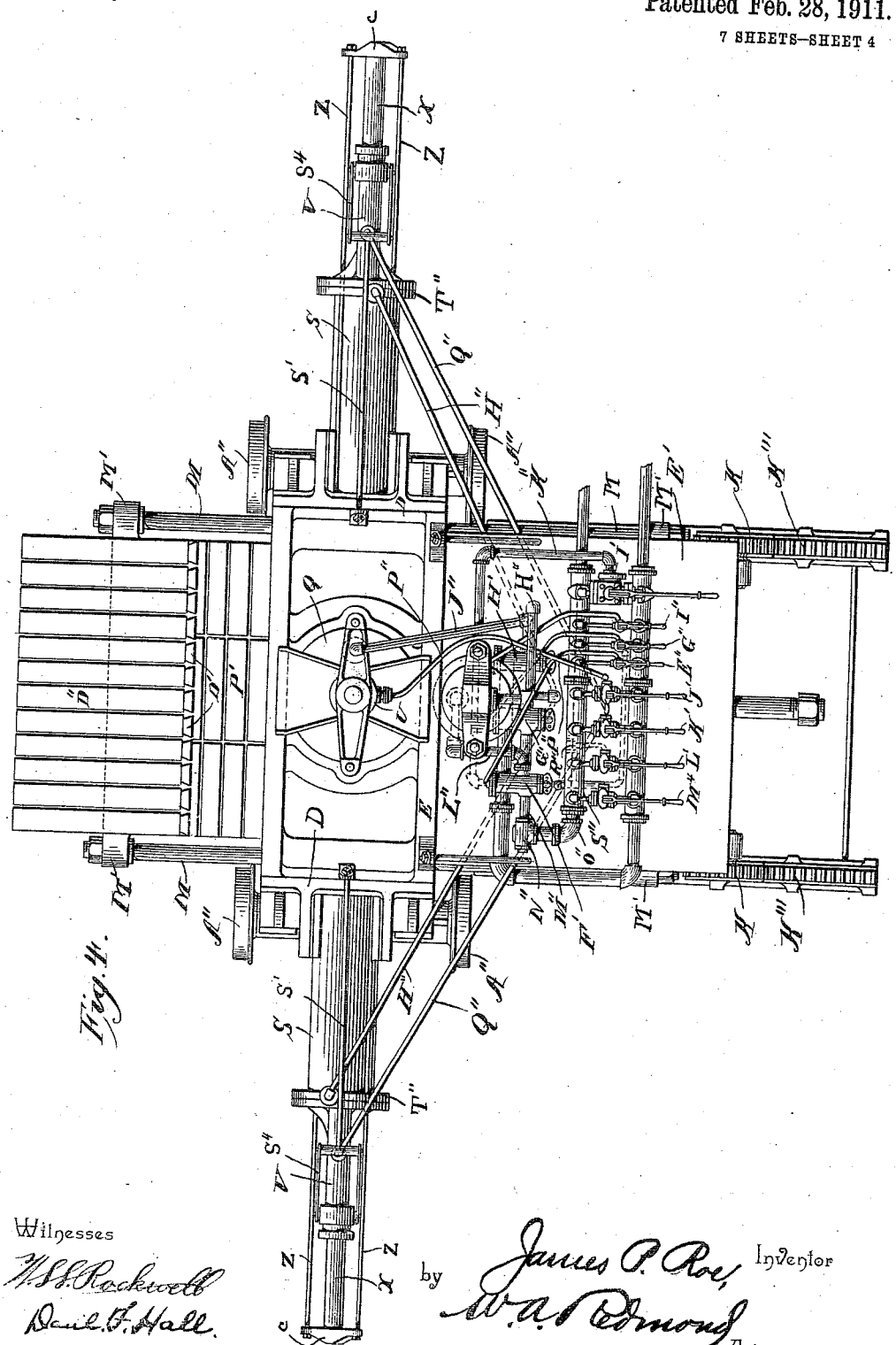

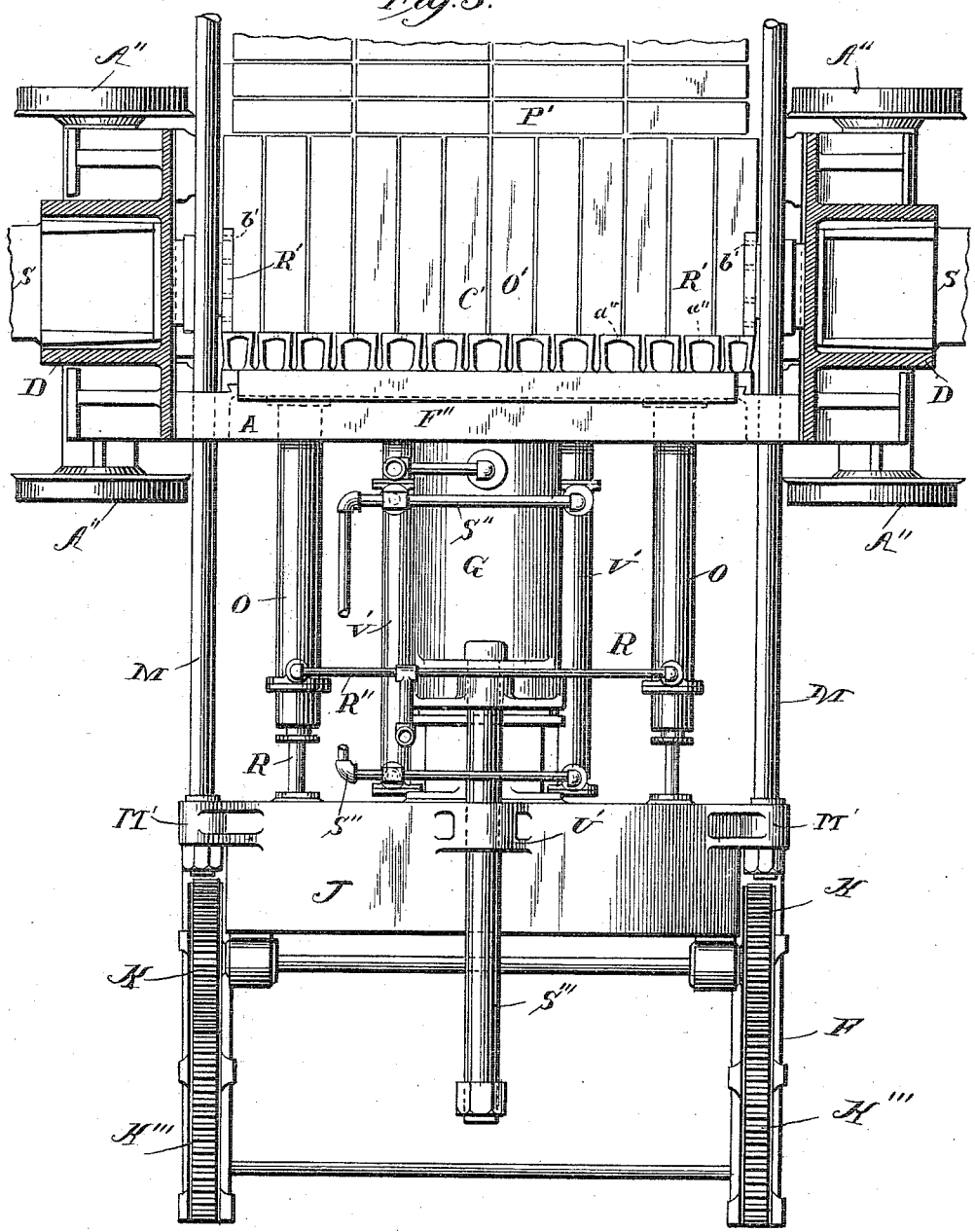

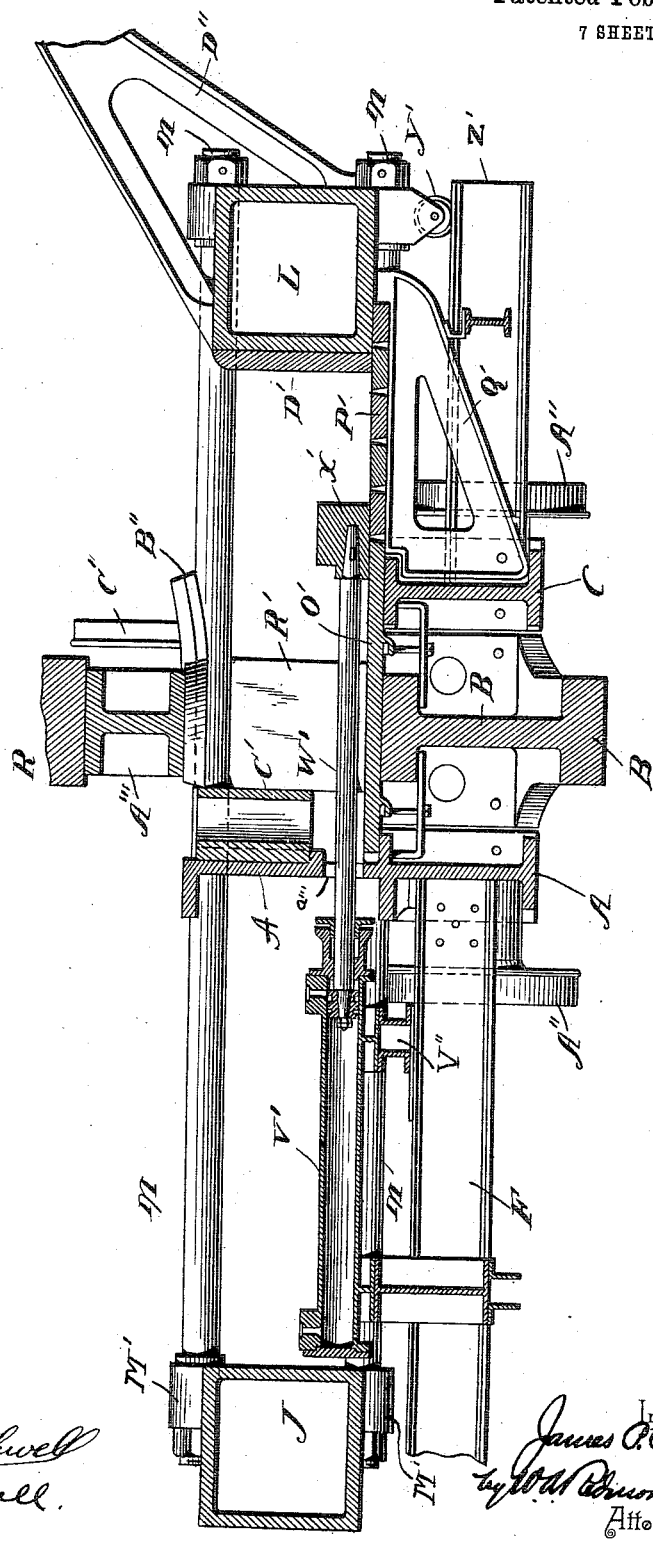

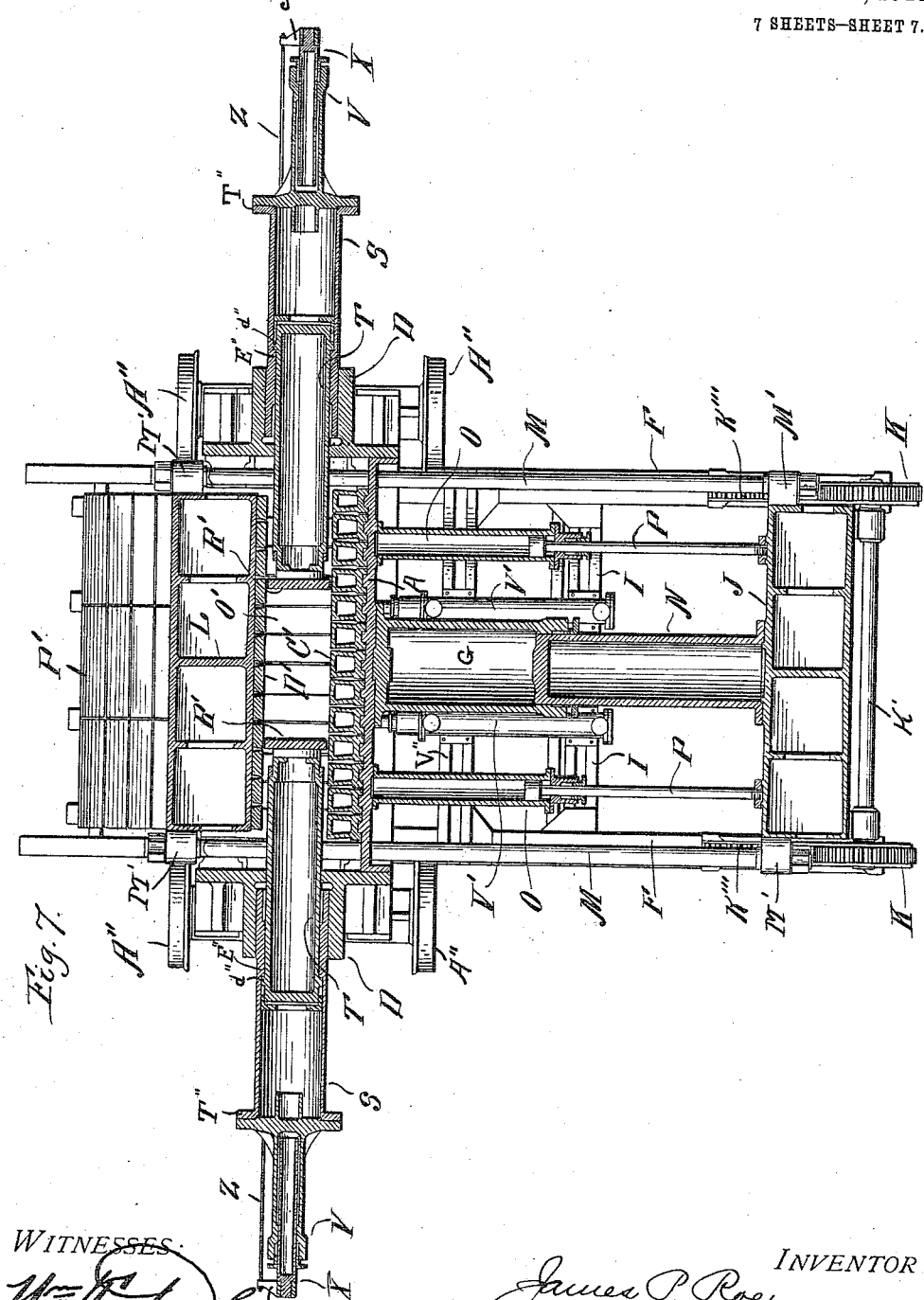

UNITED STATES PATENT OFFICE.

JAMES P. ROE, OF POTTSTOWN, PENNSYLVANIA.

SQUEEZER.

985,451. Specification of Letters Patent. Patented Feb. 28, 1911.

Application filed March 24, 1905. Serial No. 251,782.

*To all whom it may concern:*

Be it known that I, JAMES P. ROE, a citizen of the United States, residing at Pottstown, in the county of Montgomery and State of Pennsylvania, have invented certain new and useful Improvements in Squeezers; and I do declare the following to be a full, clear, and exact description of the invention, such as will enable others skilled in the art to which it appertains to make and use the same.

This invention relates to squeezers for compressing puddled balls into a solid lump, and it has for its object to provide a squeezer designed primarily to operate on very large puddled balls and to receive the same direct from oscillating furnaces, and it consists in the parts and combinations of parts hereinafter described and claimed.

In the accompanying drawings forming a part of this specification, Figure 1, is a side elevation having the front projecting parts of the machine removed; Fig. 2, a plan view having the top portions removed; Fig. 3, a transverse vertical section; Fig. 4, a plan view; Fig. 5, a plan view with the platform and valves removed; and Fig. 6, a vertical longitudinal section, on an enlarged scale, through the push out cylinders. Fig. 7 is a horizontal section through the machine on a line through the centers of the horizontal cylinders and through the squeezer box or compression space, the movable members being shown at the end of their inward stroke.

Similar letters refer to similar parts throughout all the views.

The main framing of the machine consists of the back or rear bottom girder A, the middle bottom girder B, and the front bottom girder C, (Figs. 3 and 6), the housings D at each side of the machine, and the top girder E, the latter being in the form of a rectangular casting and bolted to the housings D. The housings D are bolted to and support the bottom girders, and the entire machine is supported by the wheels A'' journaled on axles secured to the sides of the frame.

Horizontal beams F are bolted to and project at right angles from the rear girder A, and support the outer end of the cylinder G through the bracket H which rests on the angle bars I secured to and connecting said beams F. See Fig. 3. The beams F also support the cross-head J by means of the toothed wheels K which are mounted on a shaft or axle K' journaled in bearings secured to the outer face of said cross-head J, and which mesh with the teeth of racks K''' secured on the upper faces of the beams F. The cross-head J is connected at each end to the ends of a cross-head L at the opposite or front of the machine by means of the rods M, arranged in pairs at each side of the machine, said rods M being secured in lugs M' on the cross-heads by nuts, as best shown in Figs. 2 and 7, and said rods passing or extending through openings therefor in the girder A, as indicated in dotted lines Figs. 2, 5 and 7, and the bottom rods through a recess a' in girder B, as shown in Fig. 1, the girder C being similarly recessed for the passage of the bottom rods, but not shown.

The cross-head L is supported through rollers Y' on horizontal beams Z' which are bolted at one end to the front girder C and extend at right angles therefrom.

A sectional incline, formed of pieces D'', is secured to the cross-head L, and onto which is fed the mass of metal which is to be compressed.

The cross-head L is faced with the plates or pieces D' on its vertical working side, and similar pieces or plates C' are secured to the adjacent face of the girder A. See Figs. 2, 3, 6, and 7. The plates O' which form the bottom or floor for the compression or squeezing space rest on the girders A, B, C, and the transverse bottom plates P' onto which the mass of metal is first received, or delivered down the incline, are supported by brackets Q' secured to the girder C.

To the outer face of the rear girder A is secured the cylinders G and O which are arranged horizontally and extend at right angles from the said girder, the cylinders O being located or arranged one at each side of the cylinder G and resting on brackets carried by the angle bars I.

The plunger N for the cylinder G and the piston rods P for the cylinder O, are secured at their outer ends to the inner face of the cross-head J. See Figs. 2, 5 and 7.

A cylinder Q for exerting vertical pressure is arranged above the space where the mass of metal is to be compressed and at right angle to the cylinders G and O, and is supported in position by the top girder E to which it is bolted.

A plunger R is arranged to work in the cylinder Q, the return movement or stroke of which is accomplished by a plunger W, operating in a cylinder U, through the rods Y which are secured at their lower ends to lugs on the plunger R and connected at their upper ends to a cross-head $b$ which is enlarged at its middle portion and formed with an opening adapted to fit over the reduced end of the said plunger W.

On the outer end of the plunger R, of cylinder Q is secured the head or tup A''' having facing pieces B' on its bottom, and arranged adjacent thereto are the confining plates B'', which prevent the mass of metal under compression from upsetting at the ends and crowding up over the said facing pieces B', said confining plates B'' being supported in position by the struts C'', as shown in Figs. 1 and 3.

The cylinders S, which effect the side compression of the mass through their piston rods T, are arranged one at each side of the machine and extend horizontally therefrom, and are bolted at their open or mouth ends to the housings D, and at their other or outer ends are supported by the tie bars S' from the top girder E, said tie bars being connected to the links S⁴ secured to the cylinder V. The piston rods T are each formed or provided with a collar $d''$ which is adapted to engage an annular shoulder E'', formed in the cylinders S, in order to limit the stroke of the piston rods.

Facing plates or pieces R' are secured on the outer ends of the piston rods T to engage the mass of metal being compressed.

The return motions or movements of the cylinder G is accomplished through the cylinders O, and the return motions of the cylinders S by means of the cylinders V, the plungers X of the latter being secured to the cross-heads $c$ on the ends of the rods Z which are connected to the flanges T'' of the cylinders S.

In order to limit and determine the travel of the plunger N of the cylinder G the rods or bolts S''' (Fig. 3), are provided, said rods passing through the lugs T', on said cylinder, and the lugs U' on the cross-head J, the limit of travel or movement being regulated by the nuts on the ends of said bolts or rods S'''.

Cylinders V' are arranged at each side of the cylinder G and supported in position by angle bars V'' from the beams F, and their piston rods W' are provided with facing plates X' to engage the compressed mass of metal and to push or thrust the same out of the space in which it has been compressed and onto the platform formed by the transverse plates or bars P', said piston rods working through openings therefor in the girder A, as shown in Fig. 6 at $a'''$.

A platform E', supported from the frame of the machine, forms a support for the valves which control the admission of the water to the various cylinders and to the intensifier N', as follows: The pilot valve E'' controls a valve F' which, through the pipe F'' operates the cylinder G. The pilot valve G'' controls the valve G''' which, through the pipes H'', operates the cylinders S. The pilot valve I'' controls the valve H' which, through the pipe J'', operates the cylinder Q. The valve I' through the pipe K'', operates the intensifier N'. The valve J', through the pipe P'', operates the return cylinder U. The valve K' through the pipes Q'', operates the return cylinders V. The valve L' through the pipes R'', operates the return cylinders O. The valve M'', through the pipes S'' operates the cylinder V' which operates the piston for discharging the compressed mass.

The intensified water from the intensifier N' passes through the pipe L'' to the manifold M'' closing the check valve N''. The check valve N'' prevents the intensified water entering the manifold O''.

The operation of the machine is as follows: A crudely formed mass of puddled iron is delivered to the incline D'' and down which it slides into the space confined in one horizontal direction by the facing plates C' D'; in the other horizontal direction by the facing plates R'; and in a vertical direction by the bottom facing plates O' and P' and the facing plates B' and the confining plates B''. Pressure is then admitted to the cylinder G causing the plunger N to move the cross-head J away from body of machine, and as the cross-head J moves out it draws the cross-head L in, compressing the mass of puddled iron to a predetermined dimension regulated by the bolts S'''. Then pressure is admitted to the cylinders S causing the piston rods T with their facing plates R' to advance toward one another, compressing the puddled mass to a fixed dimension determined by the collars $d''$, coming in contact with the shoulders E''. The confining plates B'' prevent the mass from up-setting at the ends and crowding up over the facing plates B'. Then pressure is admitted to the cylinder Q causing the plunger R with its tup A' and facing plates B' to descend, compressing the mass in the third dimension. Any additional compression found necessary is given by the intensifier N' increasing the pressure in the various cylinders named. The intensified pressure is then released, next the initial pressure is released and pressure admitted to the various return cylinders, O, U and V and at the same time pressure is admitted to the cylinders V' causing the piston rods W' with their facing blocks X' to move out into the position shown in Fig. 6, and the solid mass to be thrust out in front of the blocks X' from which place it is removed by any convenient means. During the compression of the mass the squeezer is moved from its position in front of one of a series of puddling machines where it received its charge to a point convenient to a slabbing mill.

The whole machine is supported on a track, as shown.

The object of mounting the squeezer on wheels is to enable it to be placed in position to receive the mass direct from any one of a series of puddling machines to avoid any loss of time, thereby utilizing the best heat for perfect welding of the mass, and to reduce the oxidation of the iron which occurs rapidly while in the spongy state. But I do not confine its application to a traveling squeezer.

The various facing plates B', C', D', O', P', and R', I make sectional to avoid warping and breaking on contact with the heated mass.

Between adjacent sections, and where necessary in the section itself, I provide slots for the egress of the cinder. The slots may be formed in the sections C' as shown at $a''$, Fig. 5, and in which the slot extends into the hollow of the section, and at $b'$, same figure, wherein the slot is shown by dotted lines as extending through the section plate R'.

Having thus described my invention what I claim as new is:

1. A machine for squeezing crude masses of puddled iron, comprising a supporting frame, a fixed sectional bottom, a fixed side wall, a horizontally movable side wall opposite the fixed wall, movable end walls, means for simultaneously moving said end walls toward each other, adjustable means for limiting the movement of said walls, and a vertically movable tup for exerting downward pressure on the iron.

2. A machine for squeezing crude masses of puddled iron, comprising a supporting frame, a fixed sectional bottom, a fixed side wall, a horizontally movable side wall opposite said fixed side wall, movable end walls, means for imparting motion simultaneously to said movable end walls, a vertically movable tup, and means for ejecting the iron from the compression space of the machine.

3. A machine for squeezing crude masses of puddled iron into rectangular shapes, comprising a fixed or immovable sectional bottom, a fixed wall at right angle to said bottom, a side wall movably arranged opposite said fixed walls means for moving said last named wall horizontally, movable end walls at right angles to the side walls, means for simultaneously moving said end walls toward each other, a vertically movable tup for exerting downward pressure, an intensifier for increasing the pressure exerted by all the movable walls, and confining plates for preventing the iron upsetting under pressure.

In testimony whereof, I affix my signature, in presence of two witnesses.

JAMES P. ROE.

Witnesses:
Jno. R. Briggs,
H. S. Campbell.

---

Copies of this patent may be obtained for five cents each, by addressing the "Commissioner of Patents, Washington, D. C."